United States Patent
Suk

(10) Patent No.: US 7,230,780 B2
(45) Date of Patent: Jun. 12, 2007

(54) METHOD, APPARATUS AND PROGRAM STORAGE DEVICE FOR PROVIDING PROTRUSION FEEDBACK FOR A READ/WRITE ELEMENT

(75) Inventor: Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 149 days.

(21) Appl. No.: 10/652,726

(22) Filed: Aug. 29, 2003

(65) Prior Publication Data

US 2005/0046988 A1    Mar. 3, 2005

(51) Int. Cl.
*G11B 27/36* (2006.01)
*G11B 5/09* (2006.01)
*G11B 5/02* (2006.01)
*G11B 21/02* (2006.01)

(52) U.S. Cl. .................. 360/31; 360/53; 360/59; 360/75

(58) Field of Classification Search .......... 360/53, 360/59, 75, 31, 46, 48, 66
See application file for complete search history.

(56) References Cited

U.S. PATENT DOCUMENTS 5,880,899 A * 3/1999 Blachek et al. ............ 360/66
6,594,104 B2 * 7/2003 Tokuyama et al. ....... 360/78.02
6,760,174 B2 * 7/2004 Forehand ..................... 360/53
2003/0099054 A1 * 5/2003 Kamijima .................... 360/59
2004/0044944 A1 * 3/2004 Song ........................... 714/769

OTHER PUBLICATIONS

Wang, Run-Han, Wu, Xia Z., Weresin, Walt and Ju, Y. Sungtaek, "Head Protrusion and its Implications on Head-Disk Interface Reliability," *IEEE Transactions on Magnetics*, vol. 37, No. 4, Jul. 2001.

* cited by examiner

*Primary Examiner*—William Korzuch
*Assistant Examiner*—Daniel L. Negrón
(74) *Attorney, Agent, or Firm*—David W. Lynch; Chambliss Bahner & Stophel

(57) ABSTRACT

A method, apparatus and program storage device for providing protrusion feedback for a read/write element is disclosed. A slider with a heating element is provided to control the level of read/write element protrusion. A level of heating applied to the slider to change the head protrusion is measured and recorded until acceptable operation of the read/write element is obtained. These measurements are then used to ensure that the read/write element continues to operate properly at different drive temperatures.

22 Claims, 6 Drawing Sheets

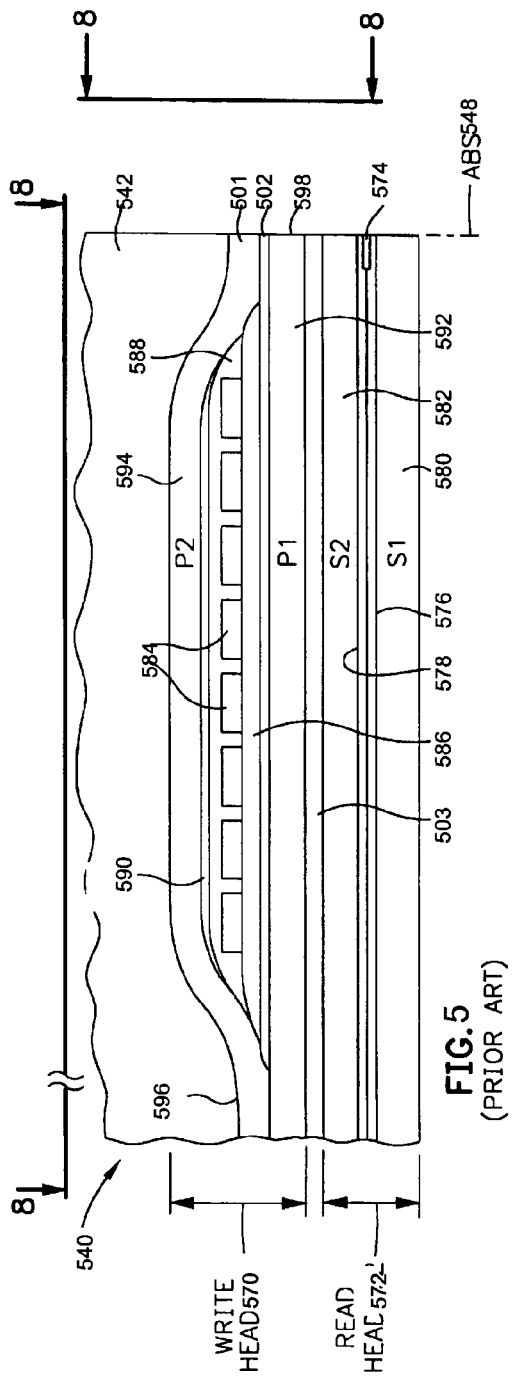
FIG. 5
(PRIOR ART)
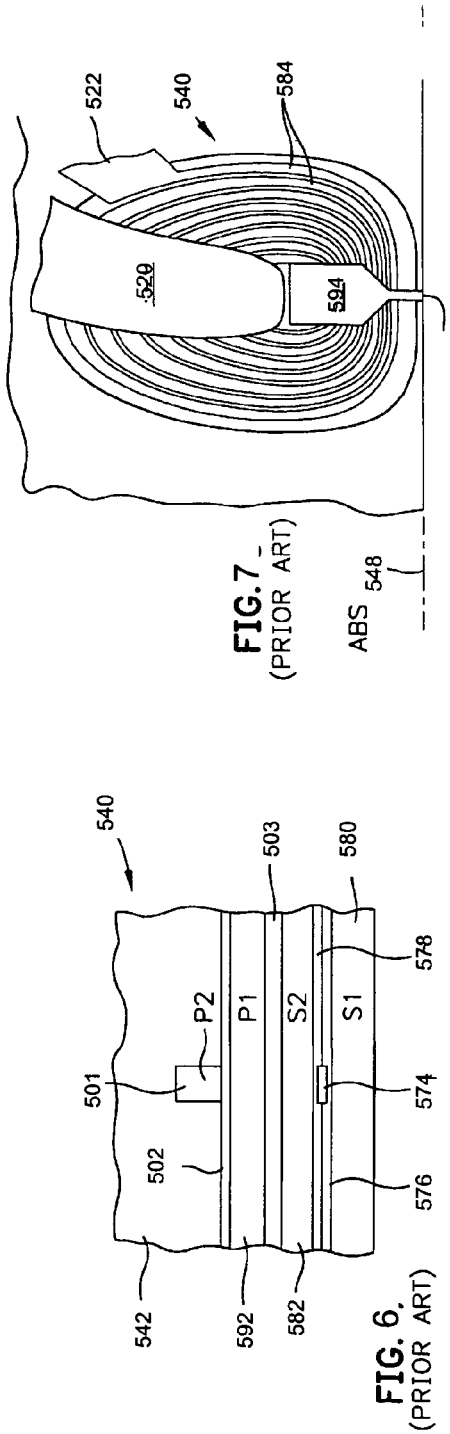
FIG. 7
(PRIOR ART)
FIG. 6
(PRIOR ART)

METHOD, APPARATUS AND PROGRAM STORAGE DEVICE FOR PROVIDING PROTRUSION FEEDBACK FOR A READ/WRITE ELEMENT

BACKGROUND OF THE INVENTION

1. Field of the Invention

This invention relates in general to a read/write elements, and more particularly to method, apparatus and program storage device for providing protrusion feedback for a read/write element.

2. Description of Related Art

Modern computers require media in which digital data can be quickly stored and retrieved. Magnetizable (hard) layers on disks have proven to be a reliable media for fast and accurate data storage and retrieval. Disk drives that read data from and write data to hard disks have thus become popular components of computer systems. In such devices, read-write heads are used to write data on or read data from an adjacently rotating hard or flexible disk.

Existing magnetic storage systems use magnetoresistive (MR) heads to read data from magnetic media and to write data onto magnetic media. MR disk drives use a rotatable disk with concentric data tracks containing the user data, a read/write head that may include an inductive write head and an MR read head for writing and reading data on the various tracks, a data readback and detection channel coupled to the MR head for processing the data magnetically recorded on the disk, an actuator connected to a carrier for the head for moving the head to the desired data track and maintaining it over the track centerline during read or write operations.

There is typically a plurality of disks stacked on a hub that is rotated by a disk drive spindle motor. A housing supports the drive motor and head actuator and surrounds the head and disk to provide a substantially sealed environment for the head-disk interface. The head carrier is typically an air-bearing slider that rides on a bearing of air above the disk surface when the disk is rotating at its operational speed. The slider is maintained in very close proximity to the disk surface by a relatively fragile suspension that connects the slider to the actuator. The spacing between the slider and the disk surface is called the flying height and its precise value is critical to the proper function of the reading and writing process.

The inductive write head and MR read head are patterned on the trailing end of the slider, which is the portion of the slider that flies closest to the disk surface. The slider is either biased toward the disk surface by a small spring force from the suspension, or is "self-loaded" to the disk surface by means of a "negative-pressure" air-bearing surface on the slider.

The MR sensor detects magnetic field signals through the resistance changes of a magnetoresistive element, fabricated of a magnetic material, as a function of the strength and direction of magnetic flux being sensed by the element. MR sensors have application in magnetic recording systems because recorded data can be read from a magnetic medium when the external magnetic field from the recorded magnetic medium (the signal field) causes a change in the direction of magnetization in an MR read head. This in turn causes a change in electrical resistance in the MR read head and a corresponding change in the sensed current or voltage. The conventional MR sensor used in magnetic recording systems operates on the basis of the anisotropic magnetoresistive (AMR) effect in which a component of the element resistance varies as the square of the cosine of the angle between the magnetization in the element and the direction of sense or bias current flow through the element.

A different and more pronounced magnetoresistance, called giant magnetoresistance (GMR), has been observed in a variety of magnetic multilayered structures, the essential feature being at least two ferromagnetic metal layers separated by a nonferromagnetic metal layer. The physical origin is the same in all types of GMR structures: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes. A particularly useful application of GMR is a sandwich structure comprising two essentially uncoupled ferromagnetic layers separated by a nonmagnetic metallic spacer layer in which the magnetization of one of the ferromagnetic layers is "pinned", and thus prevented from rotating in the presence of an external magnetic field. This type of MR sensor is called a "spin valve" sensor.

The read-write heads have been designed so that they will fly over the surface of the rotating disk at a very small, though theoretically constant distance above the disk. The separation between the read-write head and the disk is called the flying height, and is maintained by a film of air. The flying height is critical to proper function during reading and writing. If the flying height is too high during read, the read head will not be able to resolve the fine detail of the magnetic signal, thereby resulting in undecipherable data. Similarly, if the flying height is too high during a write, the magnetic flux lines that intersect the plane of the disk surface become weaker, thereby leading to loss of resolution.

As magnetic recording areal density increases, the fly height between the head and the disk continues to shrink. As discrete data storage areas are placed more closely to one another, the transducer must be positioned more closely to the recording surface to distinguish between adjacent storage areas. In recent year, transducing head flying heights have been decreased largely due to improved techniques for reducing media surface roughness. Further reductions in flying height are enabled by a super smooth polishing of media surfaces in data recording areas while also providing an adjacent head contact zone, textured to avoid stiction problems.

There are several factors that limit the reduction in slider flying height. These factors might reasonably be ignored at earlier flying heights, but would become major concerns at today's target flying heights. Factors that limit the reduction in slider flying height include variations in the sliders themselves, variations in the structure that supports the sliders, and media surface roughness.

More particularly, normal tolerances in slider fabrication lead to structural variations among the sliders in any given batch. Consequently, the flying heights of sliders in a batch are distributed over a range, although the flying height of each slider individually is substantially constant.

Disk roughness is also a problem at lower slider flying heights because maximum peaks are more likely to protrude into a normal range of slider operation. Thus, the probability of unintended and damaging slider/disk contact increases. The risk of damage from these discontinuities is greater at lower slider flying heights.

Minute slider flying heights also exaggerates thermal effects. Thermal effects include the natural tendency of materials to expand when heated, quantified by a temperature coefficient of thermal expansion more conveniently called a thermal expansion coefficient. Materials with higher coefficients expand more in response to a given temperature increase. When materials having different thermal expansion coefficients are contiguous and integral, their differing expansion when heated leads to elastic deformations and elastic restoring forces in both of the materials. Reduced flying heights increase the need to take thermal expansion and thermally induced elastic deformation into account.

When the magnetic head is operating within a disk drive its operating temperature may reach very high levels. These high temperatures are at least partly induced by the write current heating of the coil and yoke during recording. Other factors contributing to the heating include the disk velocity, contact with asperities, the frequency of the write bursts, etc. These high temperatures cause the hard baked photoresist insulation stack to expand more than the overcoat layer, which causes the overcoat layer to protrude beyond the pole tips at the air-bearing surface (ABS). This protrusion can ruin the head or severely degrade its performance. Further, the hard baking, of the photoresist layers can result in loss of signal amplitude for some read sensors, such as spin valve sensors, in an adjoining read head. The hard baked temperatures cause some intermixing of the materials of the layers, which can significantly degrade their performance. Still further, the hard baked photoresist insulation stack has poor heat dissipation, which aggravates all of the aforementioned problems.

Sliders with heating elements to control the level of read/write element protrusion are being developed. One aspect of the design of these sliders is to force protrusion of the read head so that the read head and the write head are at the same level. However, it is difficult to determine the level of protrusion, i.e., the height of the protrusion, because there is no feedback system.

It can be seen then that there is a need for a method, apparatus and program storage device for providing protrusion feedback for a read/write element.

SUMMARY OF THE INVENTION

To overcome the limitations in the prior art described above, and to overcome other limitations that will become apparent upon reading and understanding the present specification, the present invention discloses a method, apparatus and program storage device for providing protrusion feedback for a read/write element.

The present invention solves the above-described problems by providing a sliders with a heating elements to control the level of read/write element protrusion and monitoring a level of heating applied to the heating element until acceptable operation of the read/write element is obtained, i.e., sufficient head protrusion.

A method in accordance with the principles of the present invention includes writing reference data at a radius on a recording medium using a head, attempting to read the written reference data, determining whether the read attempt was successful and adjusting a level of heating on a heating element at the head to increase protrusion of the head until the read attempt is successful.

In another embodiment of the present invention, a drive system signal processor is provided. The drive system signal processor includes a memory for storing data thereon and a processor, coupled to the memory, for writing with a head reference data at a radius on a recording medium, attempting to read the written reference data, determining whether the read attempt was successful and adjusting a level of heating on a heating element for the head to increase protrusion of the head until the read attempt is successful.

In another embodiment of the present invention, a storage device is provided. The storage device includes a magnetic recording medium for recording data thereon, a transducer having an MR element for reading data stored on the magnetic recording medium and a heating element for increasing protrusion, a motor, coupled to the magnetic recording medium, for translating the magnetic recording medium, an actuator, coupled to the transducer, for translating the transducer relative to the magnetic recording medium and a storage device signal processor, coupled to the motor, transducer and actuator, for writing with the transducer reference data at a radius on the magnetic recording medium, attempting to read the written reference data, determining whether the read attempt was successful and adjusting the level of heating on the heating element to increase protrusion of the transducer until the read attempt is successful.

In another embodiment of the present invention, a program storage device readable by a computer is provided. The program storage device tangibly embodies one or more programs of instructions executable by the computer to perform a method for providing protrusion feedback for a read/write element, the method including writing reference data at a radius on a recording medium using a head, attempting to read the written reference data, determining whether the read attempt was successful and adjusting a level of heating on a heating element for the head to increase protrusion of the head until the read attempt is successful.

In another embodiment of the present invention, another drive system signal processor is provided. This drive system signal processor includes means for storing data and means, coupled to the means for storing data, for writing reference data with a head at a radius on a recording means, attempting to read the written reference data, determining whether the read attempt was successful and adjusting a level of heating on a heating element for the head to increase protrusion of the head until the read attempt is successful.

In another embodiment of the present invention, another storage device is provided. This storage device includes means for recording data thereon, means for reading and writing data on the magnetic recording medium, the means for reading and writing including heating means for increasing protrusion of the means for reading and writing, means, coupled to the means for recording data thereon, for translating the means for recording data thereon, means, coupled to the means for reading data, for translating the means for reading data relative to the means for recording data thereon and means, coupled to the means for reading data, for writing reference data at a radius on a recording means, attempting to read the written reference data, determining whether the read attempt was successful and adjusting a level of heating on a heating means to increase protrusion of the means for reading and writing until the read attempt is successful.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 5 is a side cross-sectional elevation view of a magnetic head;

FIG. 6 is an air bearing surface (ABS) view of the magnetic head of FIG. 5;

FIG. 7 illustrates the connect leads coupled to the coil for the write pole piece;

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for providing protrusion feedback for a read/write element. A slider with a heating element is provided to control the level of read/write element protrusion. A level of heating applied to the slider to change the head protrusion is measured and recorded until acceptable operation of the read/write element is obtained. These measurements are then used to ensure that the read/write element continues to operate properly at different drive temperatures.

Figure 1:
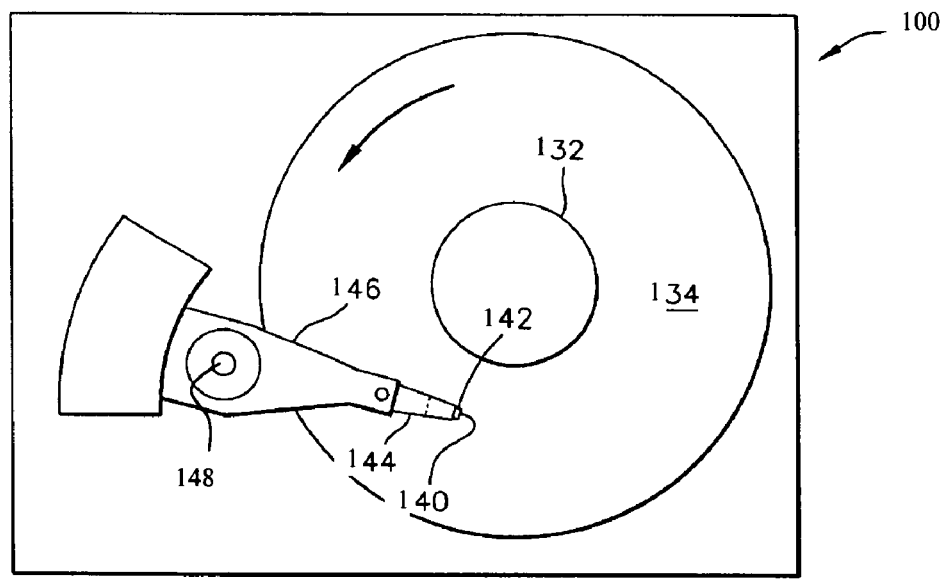
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
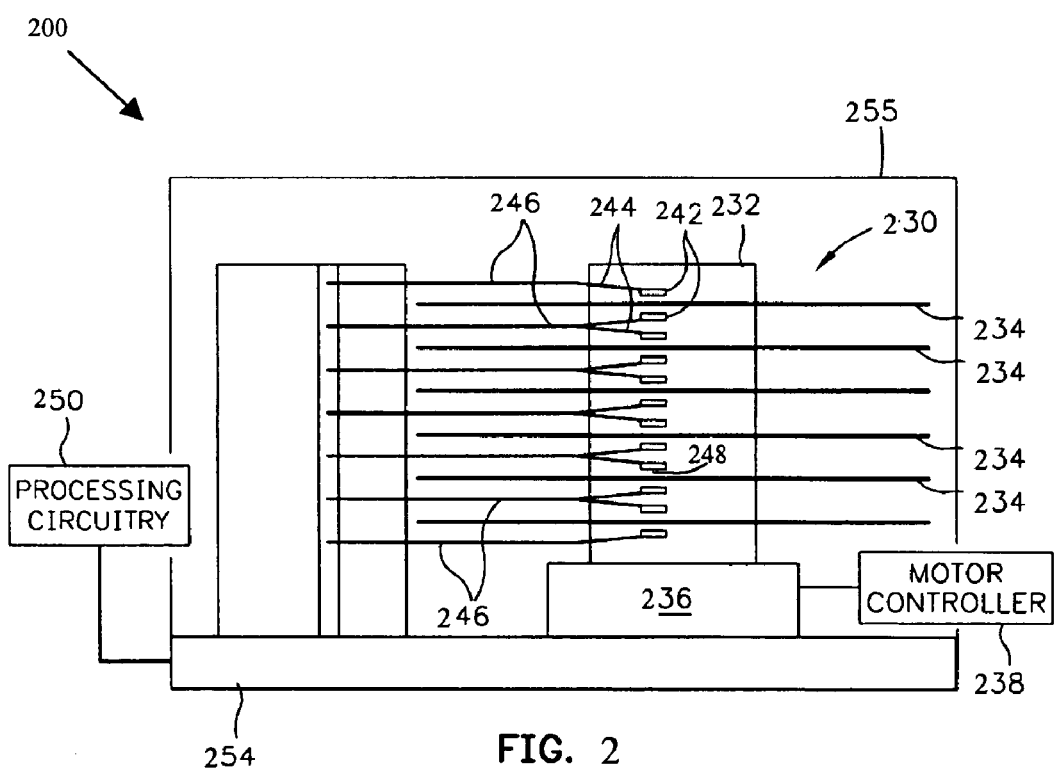
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
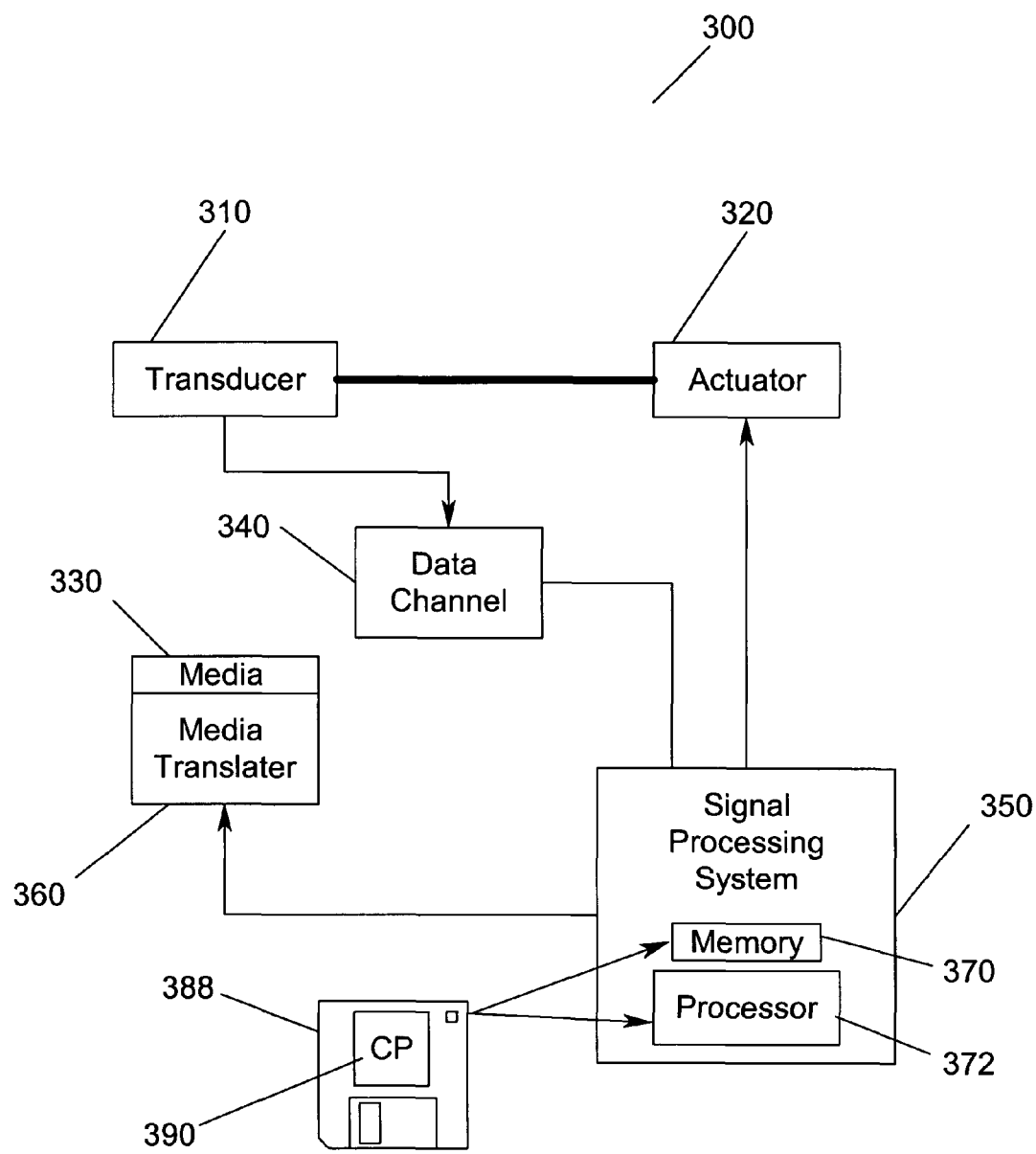
FIG. 3 illustrates a storage system according to the present invention.
Figure 8:
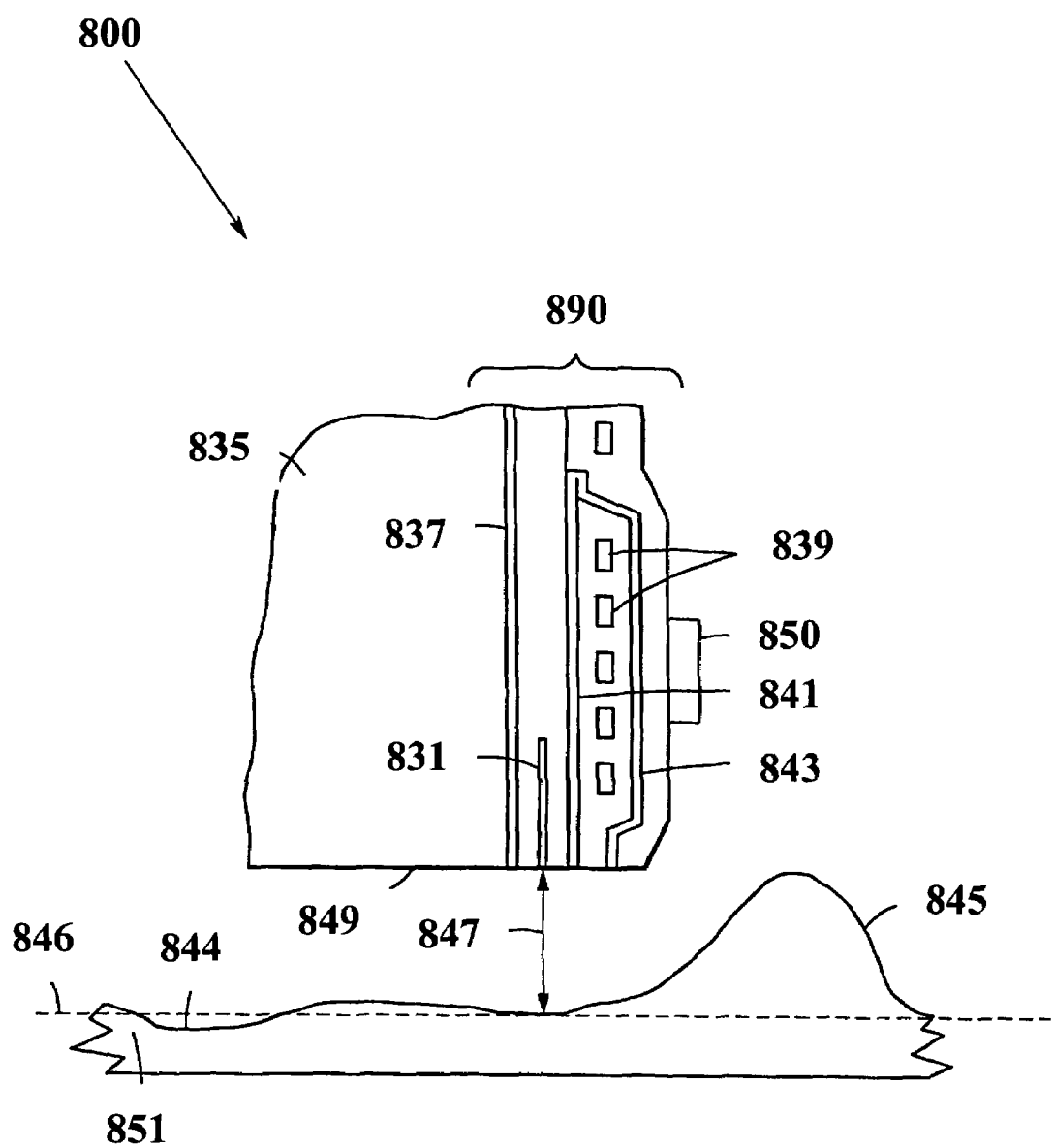
FIG. 8 shows additional detail concerning the structure of a read/write head according to an embodiment of the present invention.

FIG. 3 illustrates a storage system 300 that uses a MR sensor for sensing contact of the MR head with a recording medium based upon resistance changes in the MR element according to an embodiment of the present invention. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. The signal processor system 350 also controls the heating element (as shown in FIG. 8). Nevertheless, the present invention is not meant to be limited to a particular type of storage system 300 or to the type of media 330 used in the storage system 300.

Figure 4:
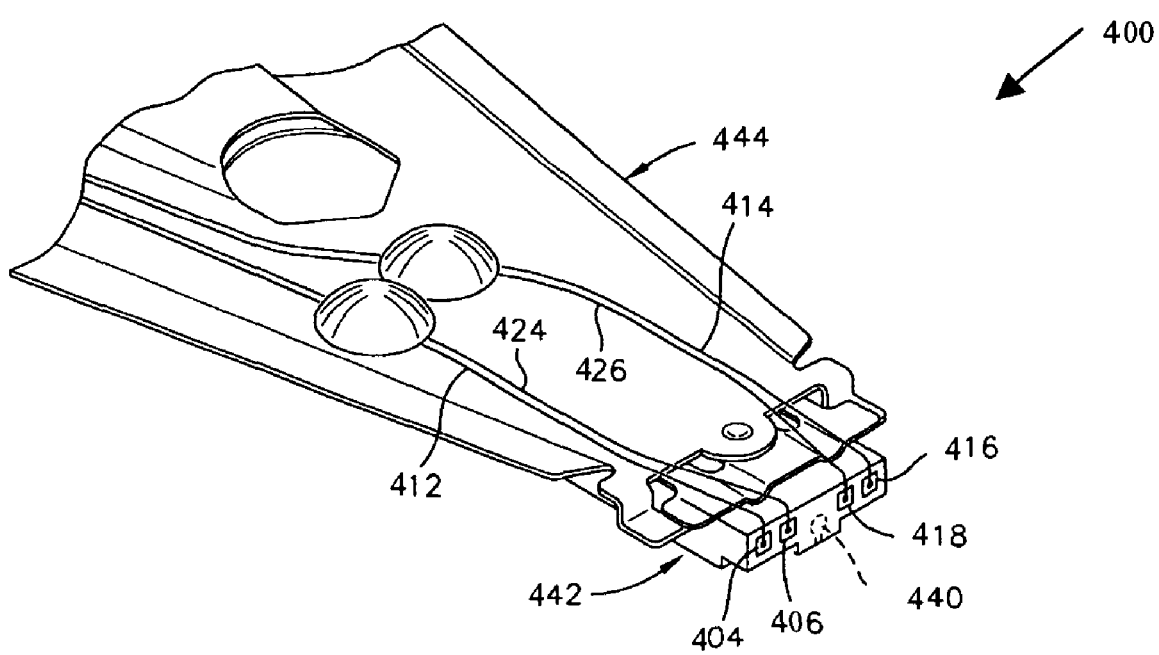
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

FIG. 5 is a side cross-sectional elevation view of a magnetic head 540. The magnetic head 540 includes a write head portion 570 and a read head portion 572 disposed on slider 542. The read head portion 572 includes a sensor 574. FIG. 6 is an ABS view of the magnetic head of FIG. 5. The sensor 574 is sandwiched between first and second gap layers 576 and 578, and the gap layers are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current $I_s$ conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first, second and third insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS 548. The first pole piece layer 592 is separated from the second shield layer 582 by an insulation layer 503.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

FIG. 8 shows additional detail concerning the structure of a read/write head 800 according to an embodiment of the present invention. In FIG. 8, the read/write head 890 is shown in relation to a magnetic disk 851. The read/write head 890 used by the invention may employ a known or novel head configuration, depending upon the needs of the application. Preferably, the head 890 is supported on a deposit end of a slider 835. The slider 835 includes an air bearing, surface 849.

The head 890 includes an MR read element 831 that is layered between a pair of magnetic shields 837, 841. Behind the shield 841 lies an inductive recording element comprised of windings 839, and pole pieces 843, 841. The air bearing surface 849 flies at a controlled flying height 847 above the surface 844 of the magnetic disk 851. Ideally, the surface 844 has an optimally flat elevation 846. However, due to manufacturing irregularities, and/or the presence of contaminants such as dust, the surface may include raised irregularities 845 that protrude above the optimally flat elevation 846.

As explained above, extreme irregularities may result in a collision between the head 890 and the disk 851. Such collisions significantly heat the sensitive MR read element 831, introducing errors into the read signals generated by the MR read element 831.

The slider 835 is typically made from a hard ceramic material, such as $AlO_2$, $TiC/Al_2O_3$ (known as "N58"), silicon carbide, or zirconium oxide, or a non-ceramic material such as silicon. Non-conductive components of the head 890 may be formed from alumina or another suitable material, whereas the conductive components may be made of a magnetic material such as iron-nickel combination or another appropriate material. The slider 835 and head 890 may be coated with a uniform overlayer (not shown), such as a carbon-based material, to protect the head 890 and slider 835 from wear, contamination, and damage. In accordance with the invention, material of the head 890 is—preferably harder than material of the disk 851 as well as contaminants and other materials on the disk 851 that may cause thermal asperities.

The head 890 also includes a selectively activated heating element 850 for heating the head 890. The heating element 850 may comprise, for example, a carbon film resistive material such as a thin film resistor, surface mount resistor or nichrome wire coil to evenly heat the head 890. Alternatively, the heating element 850 may comprise another heat generating means employing electrical, mechanical, chemical, or other suitable heat generating components and techniques. Further, the heating element may be disposed within the slider or the head 890 itself. By heating the head 890, the heating element 850 causes the head 890 to expand and thus protrude toward the disk 851.

Figure 9:
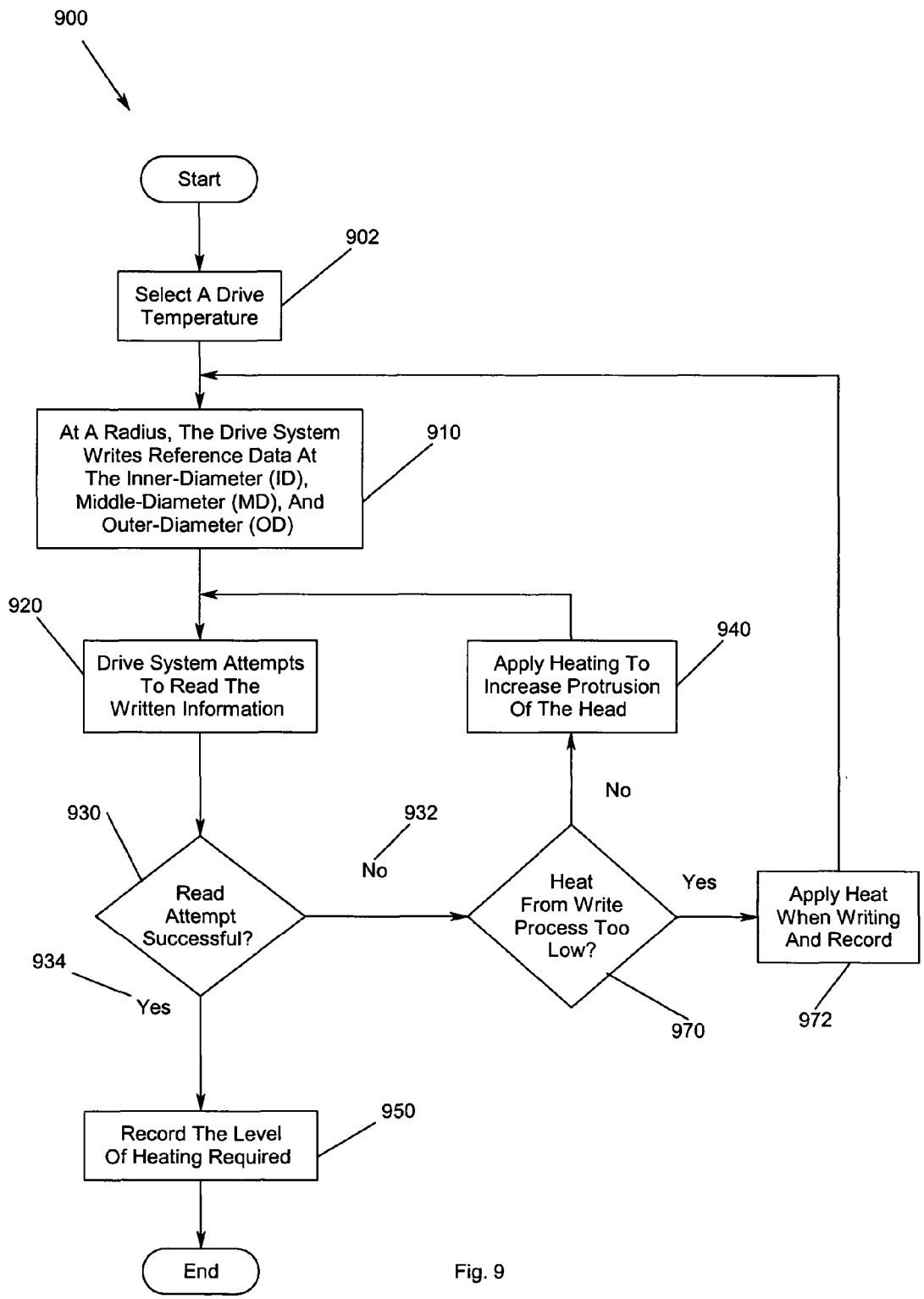
FIG. 9 illustrates a flow chart of the method for providing protrusion feedback for a read/write element according to an embodiment of the present invention.

FIG. 9 illustrates a flow chart 900 of the method for providing protrusion feedback for a read/write element according to an embodiment of the present invention. A method according to an embodiment of the present invention enables the amount of protrusion during reading and writing to be predetermined. A first drive temperature is selected 902. At a radius, the drive system writes reference data at the inner-diameter (ID), middle-diameter (MD), and outer-diameter (OD) 910. The reference data is written at prescribed frequencies for prescribed durations. This process may be performed at each radius. The drive system attempts to read the written information 920, i.e., with zero heating this time. A determination is made whether the read attempt was successful 930. If not 932, an incremental heating applied to increase protrusion of the head 940. The process again attempts to read the written information 920. If the read attempt is successful 934, the level of heating required is recorded 950. For example, these heating levels may be recording on a disk or in some other memory, such as a card programmable memory. The method for providing protrusion feedback for a read/write element according to an embodiment of the present invention may be performed at different drive temperatures. The heating levels for the different temperatures may be provided in a look-up table so that the correct value can be used for heating at any temperature. The method for providing protrusion feedback for a read/write element according to an embodiment of the present invention may also be redone in the field if recalibration is needed.

At times, the heating due to the writing process may be insufficient thereby resulting in a protrusion level that is too low 970. In this case, information will not be written correctly. Hence, the heating element may need to be activated to increase the level of protrusion and this level is recorded 972. The process is then repeated to write the reference data 910.

The process illustrated with reference to FIGS. 8–9 may be tangibly embodied in a computer-readable medium or carrier, e.g. one or more of the fixed and/or removable data storage devices 388 illustrated in FIG. 3, or other data storage or data communications devices. The computer program 390 may be loaded into memory 370 to configure the processor 372 for execution of the computer program 390. The computer program 390 include instructions which, when read and executed by a processor 372 of FIG. 3, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for providing protrusion feedback for a read/write element, comprising:
   writing reference data at a radius on a recording medium using a head;
   attempting to read the written reference data;
   determining whether the read attempt was successful;
   adjusting a level of heating on a heating element at the head to increase protrusion of the head until the read attempt is successful;
   determining whether the heating due to the writing process is too low to provide correct data writing; and
   adjusting the heating until the writing is determined to be correct.

2. The method of claim 1 further comprising recording the level of heating required to read the reference data successfully.

3. The method of claim 2, wherein the recording further comprises recording the level of heating on a disk.

4. The method of claim 2, wherein the attempting to read the reference data is performed at different drive temperatures.

5. The method of claim 4, wherein the recording the level of heating required to read the reference data successfully further comprises providing the heating levels for the different temperatures in a look-up table for providing a correct heating level at any temperature.

6. The method of claim 1, wherein the attempting to read the reference data is performed at different drive temperatures.

7. The method of claim 1 further comprises recording the heating level for obtaining correct data writing.

8. A drive system signal processor, comprising:
a memory for storing data thereon; and
a processor, coupled to the memory, for writing with a head reference data at a radius on a recording medium, attempting to read the written reference data, determining whether the read attempt was successful and adjusting a level of heating on a heating element for the head to increase protrusion of the head until the read attempt is successful, wherein the processor determines whether the heating due to the writing process is too low to provide correct data writing and adjusts the heating until the writing is determined to be correct.

9. The drive system signal processor of claim 8, wherein the processor records the level of heating required to read the reference data successfully.

10. The drive system signal processor of claim 9, wherein the processor records the level of heating on a disk.

11. The drive system signal processor of claim 9, wherein the processor performs attempts to read the reference data at different drive temperatures.

12. The drive system signal processor of claim 11, wherein the processor stores the heating levels for the different temperatures in a look-up table for providing a correct heating level at any temperature.

13. The drive system signal processor of claim 8, wherein the processor attempts to read the reference data at different drive temperatures.

14. The drive system signal processor of claim 8, wherein the processor records the heating level for obtaining correct data writing.

15. A storage device, comprising:
a magnetic recording medium for recording data thereon;
a transducer having an MR element for reading data stored on the magnetic recording medium and a heating element for increasing protrusion;
a motor, coupled to the magnetic recording medium, for translating the magnetic recording medium;
an actuator, coupled to the transducer, for translating the transducer relative to the magnetic recording medium; and
a storage device signal processor, coupled to the motor, transducer and actuator, for writing with the transducer reference data at a radius on the magnetic recording medium, attempting to read the written reference data, determining whether the read attempt was successful and adjusting the level of heating on the heating element to increase protrusion of the transducer until the read attempt is successful, wherein the storage device signal processor determines whether the heating due to the writing process is too low to provide correct data writing and adjusts the heating until the writing is determined to be correct.

16. The storage device of claim 15, wherein the storage device signal processor records the level of heating required to read the reference data successfully.

17. The storage device of claim 16, wherein the storage device signal processor records the level of heating on a disk.

18. The storage device of claim 16, wherein the storage device signal processor performs attempts to read the reference data at different drive temperatures.

19. The storage device of claim 18, wherein the storage device signal processor stores the heating levels for the different temperatures in a look-up table for providing a correct heating level at any temperature.

20. The storage device of claim 15, wherein the storage device signal processor attempts to read the reference data at different drive temperatures.

21. The storage device of claim 15, wherein the storage device signal processor records the heating level for obtaining correct data writing.

22. A program storage device readable by a computer, the program storage device tangibly embodying one or more programs of instructions executable by the computer to perform a method for providing protrusion feedback for a read/write element, the method comprising:
writing reference data at a radius on a recording medium using a head;
attempting to read the written reference data;
determining whether the read attempt was successful;
adjusting a level of heating on a heating element at the head to increase protrusion of the head until the read attempt is successful;
determining whether the heating due to the writing process is too low to provide correct data writing; and
adjusting the heating until the writing is determined to be correct.

* * * * *